C. W. ZIMMER.
POULTRY FEEDER.
APPLICATION FILED MAY 22, 1912.
1,080,133.
Patented Dec. 2, 1913.
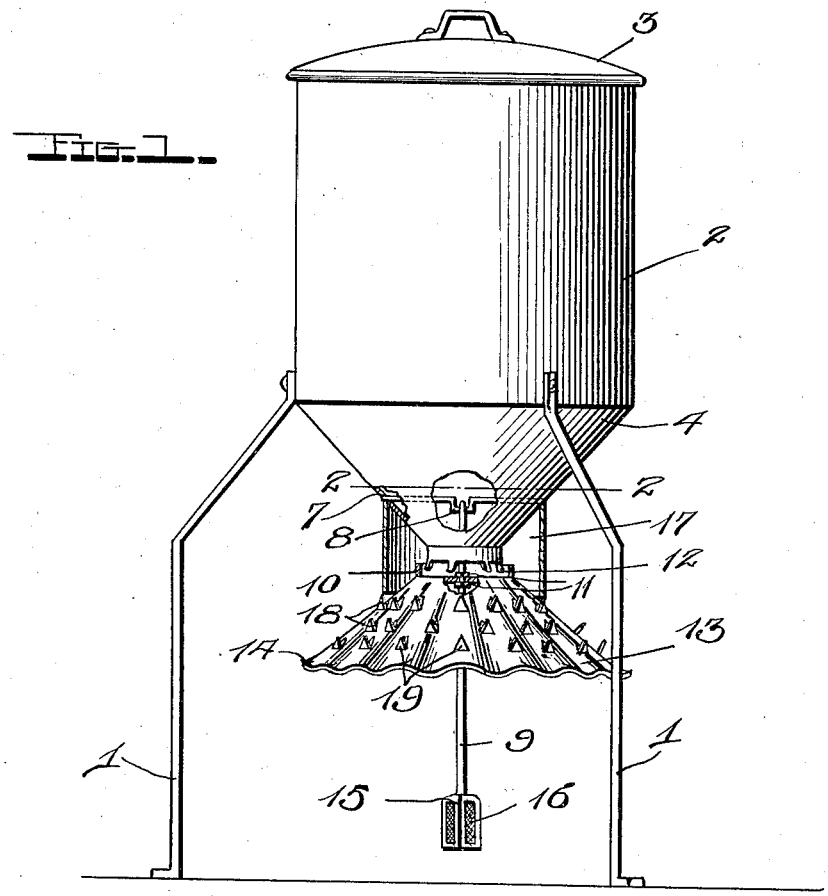
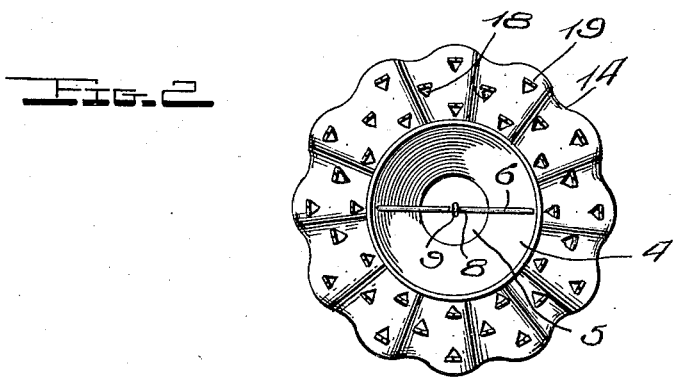
Witnesses
Inventor
C. W. Zimmer,
By Watson E. Coleman
Attorney

UNITED STATES PATENT OFFICE.

CYRUS W. ZIMMER, OF NEW YORK, N. Y.

POULTRY-FEEDER.

1,080,133.  Specification of Letters Patent.  Patented Dec. 2, 1913.

Application filed May 22, 1912.  Serial No. 699,037.

*To all whom it may concern:*

Be it known that I, CYRUS W. ZIMMER, a citizen of the United States, residing at New York, in the county of New York and State of New York, have invented certain new and useful Improvements in Poultry-Feeders, of which the following is a specification, reference being had to the accompanying drawings.

This invention relates to new and useful improvements in poultry feeders and more particularly to a feeder for automatically feeding grain to poultry, the object of the invention being to provide a feeder for feeding grains, dry mash, etc., to poultry; said device being of such construction that the fowls are caused to exercise constantly and freely by reason of their efforts to obtain feed.

Another object of the invention which forms the subject matter of this application is to provide a device that will be operable in part through gravity and in part through one or more of the fowls being fed.

A further object of the invention is to provide a feeder of this character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims, and shown in the accompanying drawings, in which—

Figure 1 is a side elevation of a poultry feeder constructed in accordance with my invention. Fig. 2 is a sectional view on the line 2—2 of Fig. 1.

Referring more particularly to the drawings, 1 indicates the supports or standards upon the upper end of which is mounted a hopper 2, provided with a detachable cover 3. The bottom of the hopper comprises the inverted cone shaped member 4 having a central opening 5 at the lower end thereof. Arranged transversely across the cone shaped bottom of the hopper is a rod 6 having its ends mounted in the openings 7 formed in the side walls of the bottom 4. The rod 6 is bent at its intermediate portion to form the crank 8 from which is loosely suspended the upper end of the rigid pendulous rod 9. Mounted upon the rod beneath the opening 5 in the bottom 4 is a shallow receptacle or cup 10 which is held securely in place by means of the adjusting nuts 11 mounted upon the rod 9 and arranged upon the upper and lower sides of the bottom of the receptacle 10 whereby the receptacle may be adjusted upon the rod with respect to the lower end of the bottom 4 of the hopper. A plurality of curved tongues 12 are formed integral with the lower end of the cone shaped bottom 4 and are arranged around the opening 5 and having their lower ends extending into the receptacle 10. Formed integral with the lower side of the receptacle at the outer edge thereof is a cone shaped deflecting plate 13 which is curved slightly upwardly at its lower edge as shown at 14 so that as the grain, which is thrown from the receptacle 10 on to the deflector 13, reaches the lower edge of the same it will be thrown in a lateral direction away from the feeder, causing it to scatter farther away from the feeder than it would otherwise, if the lower edge of the deflector was not curved upwardly.

Secured to the lower end of the rod 9 is the holder 15 for the bait which may be mixed grain or any other suitable product which is adapted to serve as an article of food for poultry. The bait may be inclosed by means of a screen 16 so that it will last longer than it otherwise would if it was left unprotected. A protector shield 17 is mounted upon the outer ends of the rod 6 and adapted to project downwardly and inclose the receptacle 10 which prevents sparrows or other birds from getting into the receptacle and also it prevents fowls from seeing the feed.

In the operation of my improved feeder the fowl upon seeing the grain forming the bait will approach the same and pick at the grain through the screen netting which causes the rod 9 to swing away from the fowl, and gravity causes it to swing back. This motion of the rod 9 carries with it the deflector 13 and the receptacle 10. Thus the receptacle moves backward and forward with the rod while the lower end of the hopper through which the grain flows remains stationary and the tongues 12 throw the grain out over the top of the receptacle. As the grain is thrown from the receptacle it drops down to the deflector 13 and drops toward the lower edge thereof and is thrown in various directions by means of the upwardly curved edge 14. The deflector 13 is provided with a plurality of triangular shaped openings 18 which are stamped therefrom, the material which is stamped from the deflector 13 to form the openings 18 being bent outwardly and disposed at right angles thereto forming a plurality of lugs 19. Thus it will be seen that as the grain passes down over the deflector the lugs will catch some of the grain and check it in its downward course so as to allow it to drop through the openings 18. It will be seen from this manner of construction that the grain can be scattered over a wide area.

The receptacle 10 may be vertically adjusted by means of the nuts 11 so that the same can be raised or lowered to permit a greater or less movement thereof with the same movement of the rod 9, and thus more or less feed is thrown out at the option of the operator.

From the above description taken in connection with the drawings, it will be readily apparent that I have provided a simple, effective and reasonably cheap feeder for feeding grains to poultry, the device being of such construction that the fowls are caused to exercise constantly and freely by reason of their efforts to obtain feed.

It is to be particularly noted that the rigid pendulous rod 9 extends up into the hopper 2 through the bottom discharge opening thereof and consequently the upper portion of said rod will serve, in the operation of the apparatus, to effectively agitate the grain and prevent it from being clogged, while at the same time this agitation will serve to pass straws, pieces of corn cob or other foreign substances which might find their way into the grain or other feed. In addition to that feature, it is also to be noted that by the construction and arrangements of the parts hereinbefore described, the pendulous rod 9 can have a free movement in any direction. Consequently, no matter at what point the bait is pecked at by the fowls, the rod and the deflector carried thereby, will be swung without friction directly away from the fowl and back again and a maximum swing will, in every instance be produced commensurate with the force of the blow. When the fowl approaches the bait holder and pecks at the grain therein, the fowl will strike a blow which will swing the rod 9 directly away from it. Consequently, as the deflector 13 and cup or receptacle 10 are carried by this pendulous rod 9 when the cup and deflector reach the limit, or near the limit, of their movement under the impulse of the blow struck by the bill of the fowl, the grain will, owing to the tipping of the deflector and cup, be liberated and pass out of the cup and upon the deflector directly above and at the point closest to the fowl, while the succeeding reverse or backward movement of the parts, under the influence of gravity, will also cause some grain to pass over the opposite side of the cup and upon the deflector, thereby effecting a maximum distribution of the grain. It is manifest that the grain which has, for example, been liberated and has fallen upon the deflector at a point substantially directly above the fowl on this first or initial swing of the rod 9 and the cup 10 and deflector 13 carried thereby will, upon the succeeding reverse movement of these parts have imparted to it not only the momentum which is produced by the force of gravity on the grain as it slides down the side of the deflector, but will also have imparted to it the momentum which is produced by the swinging movement of the deflector and consequently as the grain leaves the lower edge of the deflector, it will be thrown outwardly therefrom to a relatively great distance, and a much larger distribution will be produced than would be possible with a stationary deflector. It is clear that this result would not be so effectively accomplished or attained, if the device did not combine the two decidedly advantageous characteristics of having a cone-shaped deflector and one that is movable with and carried by the rod, because the grain is not only carried outwardly and downwardly by sliding upon the downwardly and outwardly inclined walls of the deflector, but has added to it the additional momentum which is produced thereon by the swinging movement of this deflector. In every instance, that is, at every operation, the grain is liberated upon that side of the deflector which is foremost or the advance side in the reverse swing of the pendulous rod 9, and consequently, the lines of force will always be direct and not interfered with by any lateral or angular sliding movement. It is obvious that the grain will be scattered by the swing of the deflector in any direction over a relatively wide area, and furthermore, owing to the openings in the deflector, some of the grain will be permitted to drop therethrough and consequently the grain will fall upon and be scattered over a larger area of floor or ground space than would otherwise occur.

While I have shown and described the preferred form of my invention, it will be obvious that various changes in the details of construction and in the proportions may be resorted to for successfully carrying my invention into practice without sacrificing any of the novel features or departing from the scope thereof.

What I claim is:—

1. In a device of the character described, the combination of standards, a hopper mounted upon the upper ends of said standards, an inverted cone shaped bottom for said hopper, having an opening in its lower end, a plurality of outwardly curved tongues formed at the lower end of said bottom and arranged around said opening, a transverse rod mounted in said bottom, an operating rod pivotally mounted upon the transverse rod, a receptacle adjustably mounted upon the operating rod and arranged beneath the opening in the bottom of the hopper, whereby the swinging movement of the operating rod will tilt the receptacle so that the tongues on the bottom of the hopper will throw the feed out of the receptacle.

2. In a device of the character described, the combination of standards, a hopper mounted upon the upper ends of said standards, having an inverted cone shaped bottom provided with an opening at its lower end, a plurality of tongues formed at the lower end of said bottom and arranged around the opening, a pivotally mounted receptacle arranged beneath the said opening, and means whereby the receptacle is tilted so that the tongues on the bottom of the hopper will throw the feed therefrom.

3. In a device of the character described, the combination of standards, a hopper mounted upon the upper ends of said standards, having an inverted cone shaped bottom provided with a centrally arranged opening at the lower end thereof, a plurality of tongues formed on the lower end of the cone shaped bottom and arranged around said opening, a transverse rod arranged in the bottom and having its ends rotatably mounted in the sides thereof, an operating rod pivotally mounted upon said transverse rod, a receptacle arranged beneath the opening in the bottom and adjustably mounted upon the operating rod, a cone shaped deflector, having its lower edge curved upwardly, said deflector having a plurality of triangular shaped openings stamped therefrom to form upwardly extending lugs which project at right angles to the deflector and a bait secured to the lower end of said operating rod.

4. In a device of the character described, the combination of standards, a hopper mounted upon the upper end thereof, having an inverted cone shaped bottom provided with a centrally arranged opening, a plurality of curved tongues formed at the lower end of said bottom and arranged around said opening, a transverse rod arranged in said bottom and having its ends mounted in the sides thereof, an operating rod pivotally connected at its upper end to the central portion of the transverse rod, a receptacle adjustably mounted upon the operating rod and arranged beneath the opening in the bottom of the hopper whereby the swinging movement of the operating rod will tilt the receptacle so that the curved tongues in the bottom of the hopper will throw the food therefrom, and a shield having its upper edge mounted upon the ends of the transverse rods and extending downwardly to inclose the receptacle.

5. In a device of the character described, the combination of supporting standards, a hopper mounted upon the upper ends of said standards, having an inverted cone shaped bottom provided with an opening at its lower end, a plurality of tongues formed at the lower end of said bottom and arranged around the opening, a pivotally mounted adjustable receptacle arranged beneath the opening in the bottom of the hopper, means whereby the receptacle is tilted so that the tongues on the bottom of the hopper will throw the feed therefrom, and a shield having its upper edge mounted upon the bottom of the hopper on the outer side thereof and extending downwardly to inclose the receptacle.

6. In a device of the character described, the combination of standards, a hopper mounted upon the upper ends of said standards, an inverted cone shaped bottom for said hopper, having an opening in its lower end, a plurality of tongues formed at the lower end of said bottom and arranged around said opening, a transverse rod mounted in said bottom, an operating rod pivotally mounted upon the transverse rod, a receptacle adjustably mounted upon the operating rod and arranged beneath the opening in the bottom of the hopper, whereby the swinging movement of the operating rod will tilt the receptacle so that the tongues on the bottom of the hopper will throw the feed therefrom.

7. In a device of the character described, the combination of a hopper having an inverted cone shaped bottom provided with an opening at its lower end, means for supporting said hopper, a plurality of tongues formed at the lower end of said bottom and arranged around the opening, a pivotally mounted receptacle adjustably arranged beneath the opening in the bottom of the hopper and means whereby the receptacle is tilted so that the tongues on the bottom of the hopper will throw the feed therefrom.

8. The combination with a hopper having an outlet at its lower end, of a receptacle pivotally mounted upon the hopper and arranged beneath the outlet and a plurality of tongues surrounding the outlet of the hopper and projecting into the receptacle.

9. A poultry feeder and exerciser including a hopper provided with a bottom discharge opening, a rigid pendulous rod mounted within the hopper above the discharge opening and extending down through and below the latter and suspended to swing in any direction, a deflector secured to and carried by said rod and a cup also carried by said rod and disposed underneath and contiguous to the bottom discharge opening, said rod being provided with means for holding bait, and the lower end of said rod being free.

10. A poultry feeder and exerciser including a hopper provided with a bottom discharge opening, a rigid pendulous rod mounted within the hopper above the discharge opening and extending down through and below the latter and suspended to swing in any direction, and a cup movable with the rod and normally disposed contiguous to and surrounding the said discharge opening, whereby to prevent the continuous flowing of the grain or the like out through the discharge opening when the apparatus is at rest, the rod being provided with a bait holder.

11. In a poultry feeder, a receptacle member suitably supported and having a hopper bottom provided with a restricted outlet opening, a pendulum supported within the receptacle adjacent to its bottom and extending through the opening for swinging movement, a feed scattering member carried by the pendulum beneath the opening and provided with a continuous upwardly extending portion disposed in close proximity to the opening to prevent discharge of the feed when the pendulum is stationary and a bait at the end of the pendulum whereby an attempt to obtain the same will agitate the pendulum and scattering member carried thereby to distribute the feed.

In testimony whereof I hereunto affix my signature in the presence of two witnesses.

CYRUS W. ZIMMER.

Witnesses:
 JACOB M. SHAPIRO,
 JOHN REITANO.

---

Copies of this patent may be obtained for five cents each, by addressing the "Commissioner of Patents, Washington, D. C."